US007411502B2

(12) United States Patent
Collins et al.

(10) Patent No.: US 7,411,502 B2
(45) Date of Patent: Aug. 12, 2008

(54) RADIO FREQUENCY IDENTIFICATION TAG BASED TRAY AND TRAY RECEIVING METHOD AND APPARATUS

(75) Inventors: Timothy J. Collins, Homer Glen, IL (US); Michael K. Bullock, Wauconda, IL (US); Andrew M. Khan, Schaumburg, IL (US); Robert A. Perri, Bartlett, IL (US); Richard S. Rachwalski, Lemont, IL (US)

(73) Assignee: Motorola, Inc., Schaumburg, IL (US)

( * ) Notice: Subject to any disclaimer, the term of this patent is extended or adjusted under 35 U.S.C. 154(b) by 363 days.

(21) Appl. No.: 11/380,729

(22) Filed: Apr. 28, 2006

(65) Prior Publication Data
US 2007/0252694 A1 Nov. 1, 2007

(51) Int. Cl.
  *H04Q 5/22* (2006.01)
  *G08B 13/14* (2006.01)
  *G08B 23/00* (2006.01)
  *G06F 17/00* (2006.01)
  *G06F 19/00* (2006.01)
  *G06F 7/00* (2006.01)
  *G06K 19/06* (2006.01)

(52) U.S. Cl. .............. 340/572.1; 340/10.1; 340/10.51; 340/568.1; 340/568.7; 340/572.7; 340/573.1; 235/375; 235/385; 235/492; 700/214; 700/215; 700/219; 700/220; 700/221

(58) Field of Classification Search .............. 340/10.1, 340/10.51, 568.1, 568.7, 572.1–572.7, 825.49; 235/375–385, 492; 700/214, 215
See application file for complete search history.

(56) References Cited

U.S. PATENT DOCUMENTS

| 5,724,482 | A  | * | 3/1998  | Grewe et al. ............... 704/501 |
|-----------|----|---|---------|--------------------------------------|
| 6,710,891 | B1 | * | 3/2004  | Vraa et al. ................ 358/1.12 |
| 6,812,838 | B1 | * | 11/2004 | Maloney ................. 340/568.1   |
| 7,227,469 | B2 | * | 6/2007  | Varner et al. ............ 340/572.1  |
| 7,289,855 | B2 | * | 10/2007 | Nghiem et al. ............... 607/60  |
| 7,295,120 | B2 | * | 11/2007 | Waldner et al. .......... 340/572.7   |
| 7,309,000 | B2 | * | 12/2007 | McDonald ................. 235/375    |
| 7,350,715 | B2 | * | 4/2008  | Pradhan et al. ............ 235/492   |
| 2005/0125097 | A1 | * | 6/2005  | Chudy et al. ............... 700/236  |
| 2006/0244597 | A1 | * | 11/2006 | Tethrake et al. .......... 340/572.1  |
| 2007/0252709 | A1 | * | 11/2007 | Collins et al. ............ 340/573.1 |

* cited by examiner

*Primary Examiner*—George A Bugg
*Assistant Examiner*—Lam P Pham

(57) ABSTRACT

A tray (201) comprises electrically conductive material and has at least one hand-graspable fixture (203). This hand-graspable fixture comprises an electrical conductor (301) disposed in a location that is likely to be operably interacted with by a human who grasps the hand-graspable fixture. A capacitively-coupled RFID tag is then disposed on the hand-graspable fixture with a first antenna plate (303) being electrically coupled to the tray and a second antenna plate (304) that electrically couples to the electrical conductor. A corresponding tray receiving compartment (400) has a front lip (401) over which the tray must pass and upon which the tray will rest when properly disposed within the tray receiving compartment. One or more capacitively-coupled RFID tag reader antennas (402) are disposed proximal to the front lip. These antennas may be positioned to facilitate reading the capacitively-coupled RFID tag when the tray is properly disposed within the tray receiving compartment.

19 Claims, 3 Drawing Sheets

RADIO FREQUENCY IDENTIFICATION TAG BASED TRAY AND TRAY RECEIVING METHOD AND APPARATUS

RELATED APPLICATIONS

This application relates generally to a co-pending application Ser. No. 11/380,724 and the title RADIO FREQUENCY IDENTIFICATION TAG-BASED TASK EFFECTUATION METHOD AND APPARATUS as was filed on even date herewith, the contents of which are incorporated herein by this reference.

TECHNICAL FIELD

This invention relates generally to trays and to tray receiving compartments.

BACKGROUND

Trays of various kinds are known in the art and typically serve to support other objects. As one illustrative example, a modern fast food restaurant offers a variety of food products where at least some of the food products require just-in-time or near-in-time final assembly prior to provision of those food products to a given consumer. In some cases at least one or more of these ingredients are stored on a corresponding tray or trays to hold such ingredients in readiness for use when filling a given customer order. In some cases the ingredients may require special handling during storage pending such a need. For example, the ingredients may require special heating or cooling treatment and the tray will be configured to fit within a corresponding tray receiving compartment that offers the appropriate storage conditions.

Modern service-based enterprises often face significant challenges with respect to ensuring the efficiency and accuracy of their assemblage processes. The root causes for such difficulties are many and varied. Such assemblage may require the participation of a number of service personnel. This, in turn, can lead to mis-communications regarding what, exactly, is to be done to complete a given order. Efficiency requirements can also lead to problems in this regard when service personnel are allowed only a relatively brief period of time in which to complete their particular event contributions. Problems also often exist with respect to the knowledge base of such personnel and/or the frequency and/or regularity of training requirements that often attend the very high employee turnover rates that tend to typify many service-oriented enterprises.

As a result, in some cases a worker may select an inappropriate ingredient when filling a given customer order. In other cases, the worker may not return remaining unused ingredients as may be contained within or on a tray to the correct storage location. In yet other cases the worker may return such a tray to a correct general storage location but may not properly replace the tray within a corresponding tray receiving container. This, in turn, can lead to incorrect storage of the ingredients and possible diminution of the subsequent usability of those ingredients as a result.

BRIEF DESCRIPTION OF THE DRAWINGS

The above needs are at least partially met through provision of the radio frequency identification tag-based tray and tray receiving method and apparatus described in the following detailed description, particularly when studied in conjunction with the drawings, wherein.

Figure 1:
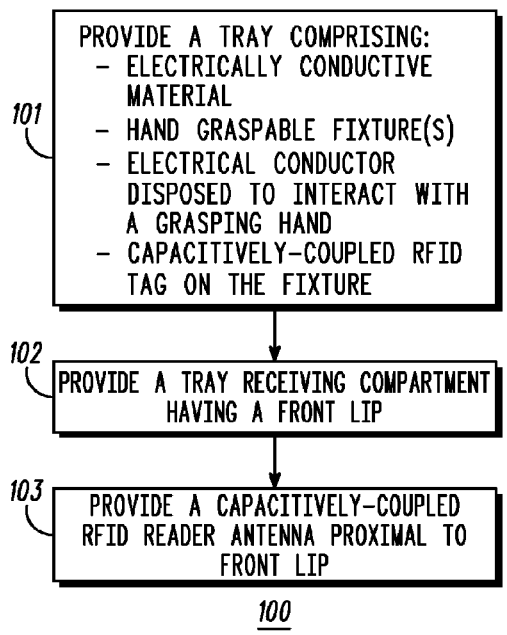
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a tray that is comprised, at least in part, of electrically conductive material and which has at least one hand-graspable fixture. By one approach this hand-graspable fixture comprises, at least in part, an electrical conductor that is disposed in a location that is likely to be operably interacted with by a human who grasps the hand-graspable fixture. A capacitively-coupled radio frequency identification tag is then disposed on the hand-graspable fixture with a first antenna plate being electrically coupled to the electrically conductive material as comprises the tray and a second antenna plate that electrically couples to the electrical conductor.

One may also provide a tray receiving compartment having a front lip over which the tray must pass and above which the hand-graspable fixture is positioned when the tray is properly disposed within the tray receiving compartment. One or more capacitively-coupled radio frequency identification tag reader antennas are then disposed proximal to the front lip. These antennas may be positioned to facilitate reading the capacitively-coupled radio frequency identification tag when the tray is properly disposed within the tray receiving compartment and the electrically conductive material of the tray electrically couples (either via a direct connection or a capacitive connection) with a grounded electrically conductive surface in the tray receiving compartment.

By one approach, if desired, the tray receiving compartment can further comprise a grounded electrically conductive surface upon which the tray will tend to rest when the tray is only partially inserted at rest within the tray receiving compartment. This can further comprise, if desired, providing at least one exposed electrical conductor that is electrically coupled to a corresponding one of the capacitively-coupled radio frequency identification tag reader antennas. So configured, when a tray is only partially inserted at rest within the tray receiving compartment, these elements will tend to couple and complete an electrical circuit path between the at least one exposed electrical conductor and the grounded electrically conductive surface to thereby facilitate detecting the incompletely inserted status of the tray.

So configured, these teachings permit a flexible and highly leverageable approach to facilitating a radio frequency identification tag-based process control system while also tending to facilitate ensuring that hurried and/or careless personnel are properly returning ingredient trays to their correct storage locations. These teachings can be implemented in relatively cost effective ways and in a manner that is consistent with various other needs and requirements of a variety of work environments.

Figure 2:
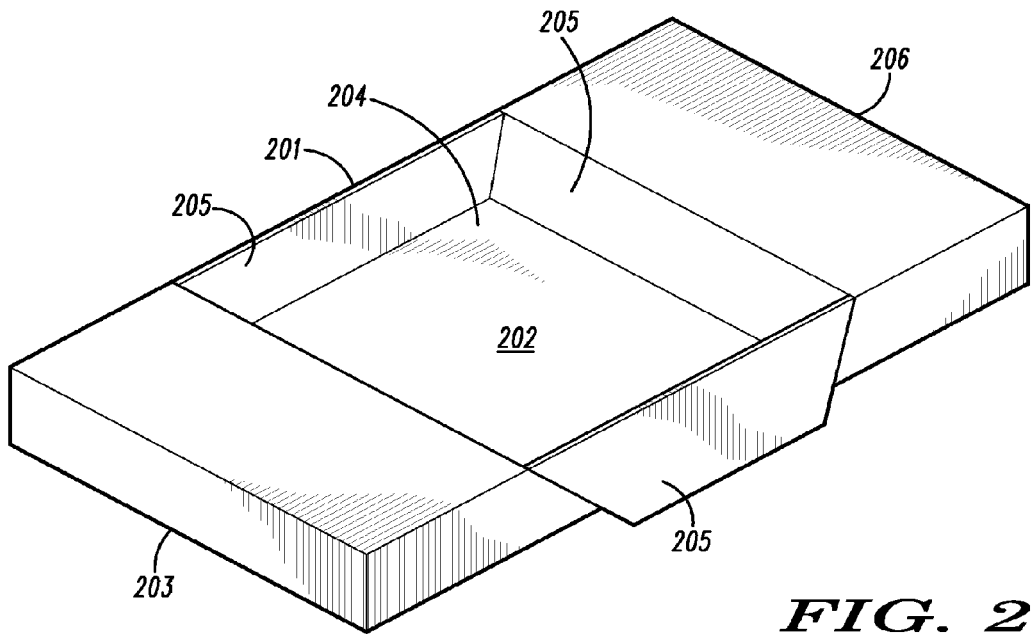
FIG. 2 comprises a perspective schematic view as configured in accordance with various embodiments of the invention.

These and other benefits may become clearer upon making a thorough review and study of the following detailed description. Referring now to the drawings, and in particular to FIG. 1, these teachings make provision for a process 100 wherein one provides 101 a tray. With momentary reference to FIG. 2, this tray 201 can be comprised, at least in part, of electrically conductive material 202 and at least one hand-graspable fixture 203. By one approach this tray 201 can be comprised of a bottom surface 204 having four sidewalls 205 disposed about the perimeter of that bottom surface 204. By one approach these components combine to form a tray having a well within which product ingredients, such as cooked hamburger patties, fried chicken, and so forth can be stored until required.

This tray 201 can be comprised of such material or materials as will suit the desired application setting. If desired, this bottom surface 204 and these sidewalls 205 can be integrally formed. Also if desired, this integral structure can be comprised in its entirety of electrically conductive material such as aluminum or the like. In the alternative, the aforementioned electrically conductive material can comprise material that is added, for example, to an exterior portion of some other material such as a ceramic material, a glass material, and so forth. Those skilled in the art will recognize that this tray 201 can have essentially any shape or size as may be appropriate for use in a given application setting. Such a tray 201 might also have one or more partition walls formed therein and/or a partial or full cover if desired.

The hand-graspable fixture may comprise a handle that is disposed at one end of the tray 201. By one approach the tray 201 can have two such hand-graspable fixtures 203 and 206 that are each affixed on opposing sides of the tray 201. By one approach this hand-graspable fixture is comprised, at least in part, of electrically non-conductive material (such as plastic).

Figure 3:
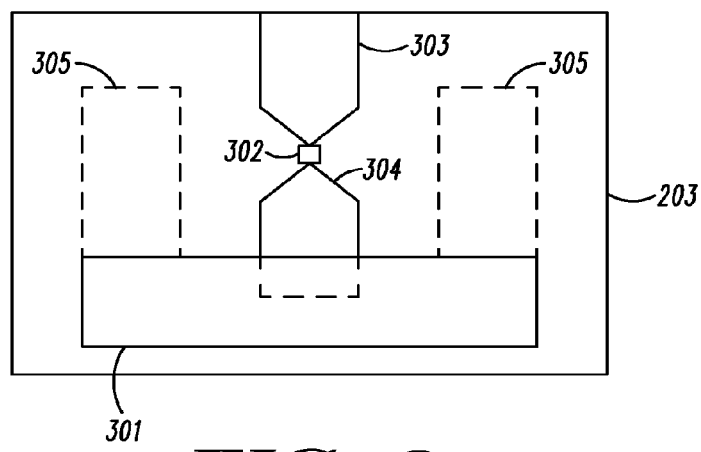
FIG. 3 comprises a top plan detail schematic view as configured in accordance with various embodiments of the invention.

With momentary reference now to FIG. 3, this hand-graspable fixture 203 can additionally comprise an electrical conductor 301 that is disposed in a location that is likely to be operably interacted with by a human (not shown) who grasps the hand-graspable fixture 301. By one approach this electrical conductor 301 can be exposed on an exterior surface (such as the top and/or the bottom) of the hand-graspable fixture 203 to thereby permit and facilitate direct electrical connections between the electrical conductor 301 and such a human. By another approach this electrical conductor 301 can be embedded within the hand-graspable fixture 203. In such a case, the operable interaction between the human and the electrical conductor 301 can comprise capacitive interaction.

If desired, and perhaps especially when the desired operable interaction comprises capacitive interaction, additional electrically conductive members 305 can be electrically joined or coupled to the aforementioned electrical conductor 301. Such a provision, for example, may increase sensitivity to detecting or otherwise responding to meaningful proximity of a human with respect to the hand-graspable fixture 203.

These teachings also provide for inclusion of a capacitively-coupled radio frequency identification tag. In particular, a capacitively-coupled radio frequency identification tag integrated circuit 302 as is known in the art can be mounted on or within the hand-graspable fixture 203. In addition, a first antenna plate 303 can be provided that is electrically coupled to the tray (and in particular to the electrically conductive portion of the tray) and a second antenna plate 304 can be provide that is electrically coupled to the aforementioned electrical conductor 301.

The capacitively-coupled radio frequency identification tag integrated circuit 302 can contain, for example, information that identifies the components as are properly contained within the tray. For example, this integrated circuit can contain information that specifically signifies that the corresponding tray contains cooked hamburger patties, fried chicken, or such other ingredients or product components as may be desired.

Figure 4:
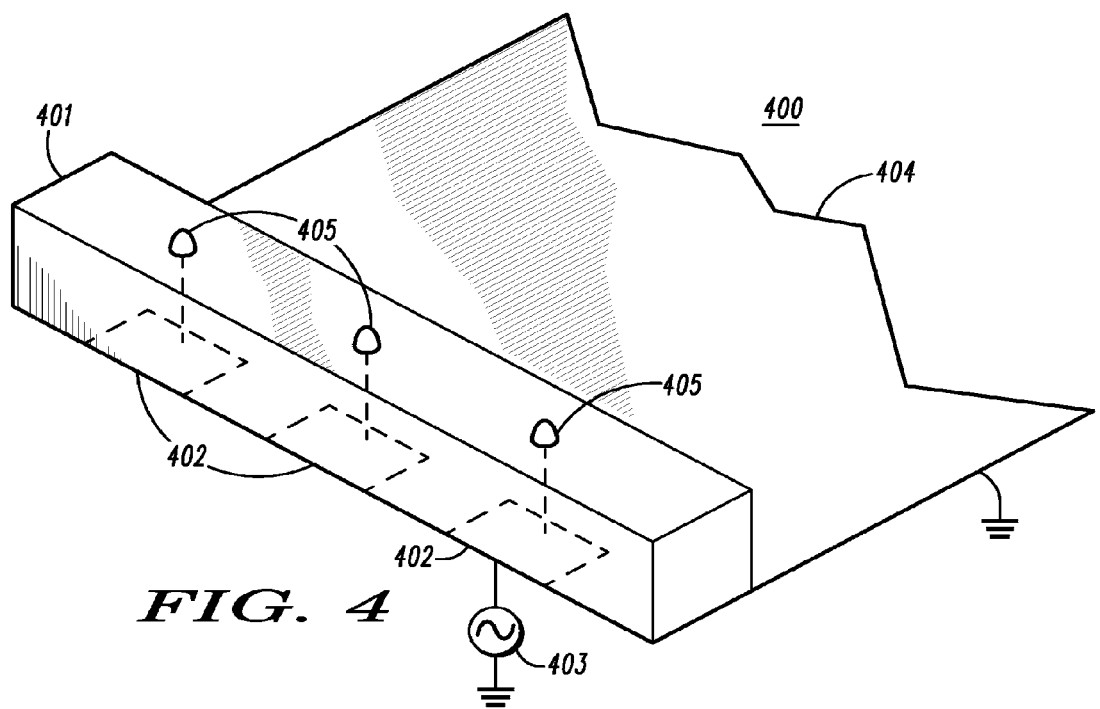
FIG. 4 comprises a perspective detail schematic view as configured in accordance with various embodiments of the invention.

Referring again to FIG. 1, this process 100 can also provide for provision 102 of a tray receiving compartment. By one approach, and referring momentarily to FIG. 4, this tray receiving compartment 400 can comprise a front lip 401 over which the aforementioned tray must pass and above which the hand-graspable fixture 203 is positioned when the tray is properly disposed within the tray receiving compartment 400. By one approach this front lip 401 is comprised of electrically non-conductive material such as, but not limited to, plastic. The width of this front lip 401 (and indeed the width of the entire tray receiving compartment 400) can be sufficient to receive one or more trays. By one approach the tray receiving compartment 400 comprises a warming chamber that is configured to receive at least one such tray and that has facilities to facilitate maintaining the contents of the trays at about a desired temperature.

Figure 5:
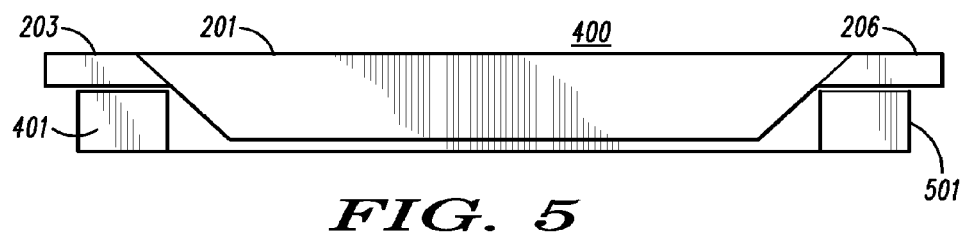
FIG. 5 comprises a side elevational schematic view as configured in accordance with various embodiments of the invention.

If desired, and referring momentarily to FIG. 5, a similar lip 501 can be disposed near the rear of the tray receiving compartment 400. So configured, a tray 201 can be readily disposed within the tray receiving compartment 400 and brought to rest with each of the two hand-graspable fixtures 203 and 206 positioned above a corresponding one of the lips 401 and 501. Although lips 401 and 501 are shown protruding above the surface of the receiving compartment 404, it is understood that the lips could be substantially flush with this receiving compartment surface 404.

With reference to FIG. 1, this process 100 then provides for provision 103 of at least one capacitively-coupled radio frequency identification tag reader antenna. By one approach this antenna (or these antennas) is disposed proximal to the front lip such that this antenna (or antennas) will facilitate reading the capacitively-coupled radio frequency identification tag as comprises a part of the tray when the tray is properly inserted in the tray receiving compartment 400.

To illustrate, and referring again to FIG. 4, the tray receiving compartment 400 can comprise one or more capacitively-coupled radio frequency identification tag reader antennas 402 that are disposed proximal to the front lip 401 to facilitate reading the capacitively-coupled radio frequency identification tag as comprises a part of the tray hand-graspable fixture when the tray is properly disposed within the tray receiving compartment 400. Each such antenna 402 couples, as known in the art, to a capacitively-coupled radio frequency identification tag reader 403 (with only a portion of one such reader 403 being schematically shown in FIG. 4 for the sake of clarity and simplicity).

So configured, the tray receiving compartment 400 can readily read the capacitively-coupled radio frequency identification tag as comprises a part of each tray when such trays are properly placed within the tray receiving compartment 400. This, in turn, permits automatic monitoring regarding whether or not such trays are being properly selected for use and are being returned to a proper storage location within the tray receiving compartment 400. (The interested reader will find more information regarding the use of such a capability upon referring to the previously mentioned RADIO FREQUENCY IDENTIFICATION TAG-BASED TASK EFFECTUATION METHOD AND APPARATUS patent application.)

If desired, the tray receiving compartment 400 can be further configured to detect inappropriate partial placement of such a tray within the tray receiving compartment 400. In this regard, by one approach, the tray receiving compartment can further comprise a grounded electrically conductive surface 404 upon which a tray will tend to rest when the tray is only partially inserted at rest within the tray receiving compartment. For example, and referring momentarily to FIG. 6, the bottom 404 of the tray receiving compartment 400 can comprise an electrically conductive material that is itself connected to ground. Referring again to FIG. 4, the front lip 401 can further comprise at least one exposed electrical conductor 405 (with three such exposed electrical conductors 405 being depicted for the sake of example). Each of these exposed electrical conductors 405 is electrically coupled (preferably via a direct connection) to a corresponding one of the capacitively-coupled radio frequency identification tag reader antennas 402.

Figure 6:
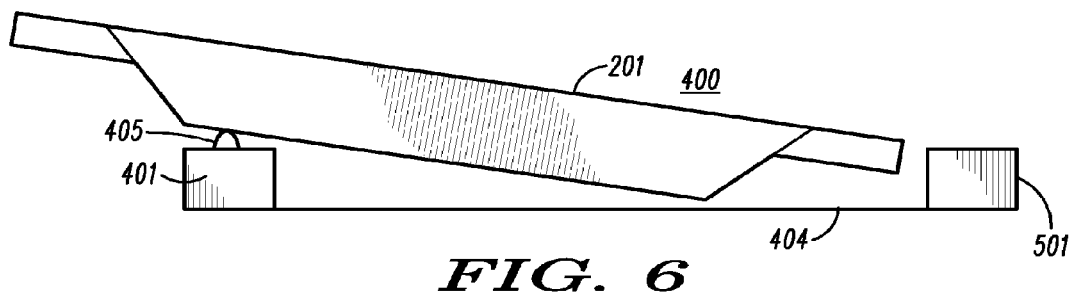
FIG. 6 comprises a side elevational schematic view as configured in accordance with various embodiments of the invention.

So configured, a tray that is only partially inserted at rest within the tray receiving compartment will tend to complete an electrical circuit path between the at least one exposed electrical conductor 405 and the grounded electrically conductive surface 404 to thereby facilitate detecting incomplete insertion of the tray within the tray receiving compartment 400. FIG. 6 illustrates such a circumstance where the tray 201 is at rest without human assistance in a partially-but-not-fully inserted manner with respect to the tray receiving compartment 400. So positioned, the electrically conductive material as comprises the tray 201 connects the antenna-connected exposed electrical conductor 405 to the grounded electrically conductive surface 404 (either via a direct connection or a capacitive connection) as comprises the bottom of the tray receiving compartment 400. This state, when readily detected through monitoring of the capacitively-coupled radio frequency identification tag reader as corresponds to this particular antenna, can be used as desired to signal local personnel or to otherwise trigger an appropriate responsive action or event.

In an alternative embodiment where the identification of tray position within the receiving compartment is not required, the front lip 401 can be made of a conductive material that is coupled to a capacitively-coupled radio frequency identification tag reader 403. In this configuration, those skilled in the art will appreciate that the front lip 401 serves the functions of the aforementioned capacitively-coupled radio frequency identification tag reader antennas 402 and the antenna-connected exposed electrical conductors 405. This embodiment would typically benefit from a radio frequency identification system implementation that includes a tag anti-collision protocol if more than one tray is to be placed within the receiving compartment.

Those skilled in the art will recognize and appreciate that these teachings are readily employed to monitor and support a variety of process effectuation events. This can include, for example, detecting when expected (or unexpected) access has been made by personnel to a given tray and its corresponding contents and/or that a given tray (and its corresponding contents) has been returned to a proper place within the tray receiving compartment. These teachings are also applicable to aid with detecting when a monitored tray has not been fully inserted within a given tray receiving compartment. These teachings therefore serve to aid with ensuring that tray-borne components are being properly used and stored during periods of non-use.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A apparatus comprising:
    a tray comprised, at least in part, of electrically conductive material;
    at least one hand-graspable fixture affixed to the tray wherein the hand-graspable fixture comprises, at least in part, an electrical conductor that is disposed in a location to be operably interacted with by a human who grasps the hand-graspable fixture;
    a capacitively-coupled radio frequency identification tag disposed on the hand-graspable fixture and having a first antenna plate that is electrically coupled to the tray and a second antenna plate that is electrically coupled to the electrical conductor.

2. The apparatus of claim 1 wherein the tray is fully comprised of electrically conductive material.

3. The apparatus of claim 1 wherein the tray further comprises sidewalls disposed about a perimeter of the tray.

4. The apparatus of claim 1 further comprising at least two of the hand-graspable fixtures affixed to the tray.

5. The apparatus of claim 4 wherein two of the hand-graspable fixtures are affixed on opposing sides of the tray.

6. The apparatus of claim 1 wherein the at least one hand-graspable fixture is comprised, in part, of electrically non-conductive material.

7. The apparatus of claim 1 wherein the capacitively-coupled radio frequency identification tag contains information identifying components as are properly contained within the tray.

8. The apparatus of claim 1 wherein the electrical conductor comprises an exposed electrical conductor that is disposed in a location likely to be contacted by a human who grasps the hand-graspable fixture.

9. An apparatus comprising:
    a tray receiving compartment having a front lip over which the tray must pass when inserted; the front lip comprises at least one exposed electrical conductor that is electrically coupled to a corresponding one of at least one capacitively-coupled radio frequency identification tag reader antenna, such that a tray which is only partially inserted at rest within the tray receiving compartment will complete an electrical circuit path between the at least one exposed electrical conductor and a grounded electrically conductive surface to thereby facilitate detecting incomplete insertion of the tray within the tray receiving compartment;

at least one capacitively-coupled radio frequency identification tag reader antenna disposed proximal to the front lip and being positioned to facilitate reading a capacitively-coupled radio frequency identification tag as comprises a part of the tray when the tray is properly disposed within the tray receiving compartment.

10. The apparatus of claim 9 wherein the front lip is comprised of electrically non-conductive material.

11. The apparatus of claim 9 wherein the tray receiving compartment is sized to properly receive a plurality of the trays.

12. The apparatus of claim 9 wherein the at least one capacitively-coupled radio frequency identification tag reader antenna comprises a plurality of capacitively-coupled radio frequency identification tag reader antennas.

13. The apparatus of claim 9 wherein the tray receiving compartment further comprises the grounded electrically conductive surface upon which the tray will rest when the tray is only partially inserted at rest within the tray receiving compartment.

14. The apparatus of claim 9 wherein the front lip is one of:
substantially flush with a surface of the tray receiving compartment;
protruding above the surface of the tray receiving compartment.

15. A method comprising:
providing a tray comprised, at least in part, of:
electrically conductive material;
at least one hand-graspable fixture wherein the hand-graspable fixture comprises, at least in part, an electrical conductor that is disposed in a location to be operably interacted with by a human who grasps the hand-graspable fixture;
a capacitively-coupled radio frequency identification tag disposed on the hand-graspable fixture and having a first antenna plate that is electrically coupled to the electrically conductive material and a second antenna plate that is electrically coupled to the electrical conductor;
providing a tray receiving compartment having a front lip over which the tray must pass when inserted;
providing at least one capacitively-coupled radio frequency identification tag reader antenna disposed proximal to the front lip and being positioned to facilitate reading the capacitively-coupled radio frequency identification tag when the tray is properly disposed within the tray receiving compartment.

16. The method of claim 15 wherein the tray comprises at least two of the hand-graspable fixtures.

17. The method of claim 16 wherein two of the hand-graspable fixtures are affixed on opposing sides of the tray.

18. The method of claim 15 wherein providing a tray receiving compartment further comprises providing a grounded electrically conductive surface upon which the tray will rest when the tray is only partially inserted at rest within the tray receiving compartment.

19. The method of claim 16 wherein providing a tray receiving compartment having a front lip further comprises providing at least one exposed electrical conductor that is electrically coupled to the at least one capacitively-coupled radio frequency identification tag reader antenna, such that a tray which is only partially inserted at rest within the tray receiving compartment will complete an electrical circuit path between the at least one exposed electrical conductor and the grounded electrically conductive surface to thereby facilitate detecting incomplete insertion of the tray within the tray receiving compartment.

* * * * *